(12) United States Patent
Rebbie et al.

(10) Patent No.: US 10,081,325 B2
(45) Date of Patent: Sep. 25, 2018

(54) SPLINED LAP BAR ASSEMBLY FOR AMUSEMENT RIDE CAR

(71) Applicant: Philadelphia Toboggan Coasters, Inc., Hatfield, PA (US)

(72) Inventors: Thomas D. Rebbie, Quakertown, PA (US); Torrence V. Jenkins, Jr., Denver, PA (US); Richard W. Snyder, Quakertown, PA (US)

(73) Assignee: Philadelphia Toboggan Coasters, Inc., Hatfield, PA (US)

( * ) Notice: Subject to any disclaimer, the term of this patent is extended or adjusted under 35 U.S.C. 154(b) by 55 days.

(21) Appl. No.: 15/437,204

(22) Filed: Feb. 20, 2017

(65) Prior Publication Data

US 2017/0253208 A1    Sep. 7, 2017

Related U.S. Application Data

(60) Provisional application No. 62/304,648, filed on Mar. 7, 2016.

(51) Int. Cl.
*B60R 21/02* (2006.01)
*B60R 21/00* (2006.01)

(52) U.S. Cl.
CPC ...... *B60R 21/02* (2013.01); *B60R 2021/0097* (2013.01)

(58) Field of Classification Search
CPC .................. B60R 21/02; B60R 2021/0097
See application file for complete search history.

(56) References Cited

U.S. PATENT DOCUMENTS

| 4,782,715 A * | 11/1988 | Chevance ............... B60N 2/164 74/89.39 |
| 5,453,053 A | 9/1995 | Danta et al. |
| 5,529,382 A * | 6/1996 | Burkat ..................... A63G 7/00 297/487 |
| 5,688,178 A * | 11/1997 | Emrie ...................... A63G 1/38 438/654 |
| 2005/0001466 A1* | 1/2005 | Zambelli .................. A47C 7/54 297/464 |
| 2005/0197195 A1* | 9/2005 | Zamperla ................. A47C 7/54 472/37 |
| 2010/0013205 A1* | 1/2010 | Keller ................. B60R 22/4676 280/807 |
| 2010/0307288 A1 | 12/2010 | Lubman et al. |
| 2010/0308552 A1* | 12/2010 | Mival ...................... B62B 7/08 280/47.4 |
| 2016/0114750 A1* | 4/2016 | Howard .................. B60R 21/02 297/466 |

* cited by examiner

*Primary Examiner* — Darlene P Condra
(74) *Attorney, Agent, or Firm* — Caesar Rivise, PC (57) ABSTRACT

An apparatus and method for forming a releasable lockable lap bar assembly that optimizes the resistance against lap bar axle and lap bar connecting arm slippage. The invention involves the use of a plurality of splines on the end of the lap bar axle that is coupled within a stop sleeve in the distal end of the lap bar connecting arm. The stop sleeve also includes a plurality of splines aligned with an axis of the sleeve. The plurality of splines on the lap bar axle are aligned with a lap bar axis. When the splined end of the axle is inserted into the stop sleeve, the respective plurality of splines interdigitate to form a tight engagement of the lap bar axle and the connecting arm. Bolts in apertures of the stop sleeve can also be used to further prevent the lap bar axle from backing out of the sleeve.

8 Claims, 9 Drawing Sheets

SPLINED LAP BAR ASSEMBLY FOR AMUSEMENT RIDE CAR

CROSS-REFERENCE TO RELATED APPLICATIONS

This non-provisional application claims the benefit under 35 U.S.C. § 119(e) of Application Ser. No. 62/304,648 filed on Mar. 7, 2016 entitled SPLINED LAP BAR ASSEMBLY FOR AMUSEMENT RIDE CAR and whose entire disclosure is incorporated by reference herein.

BACKGROUND OF THE INVENTION

The present invention relates generally to amusement rides and, more particularly, to a device and method for connecting the lap bar to the locking and release mechanism of an amusement ride car in a more secure manner.

Figure 1A:
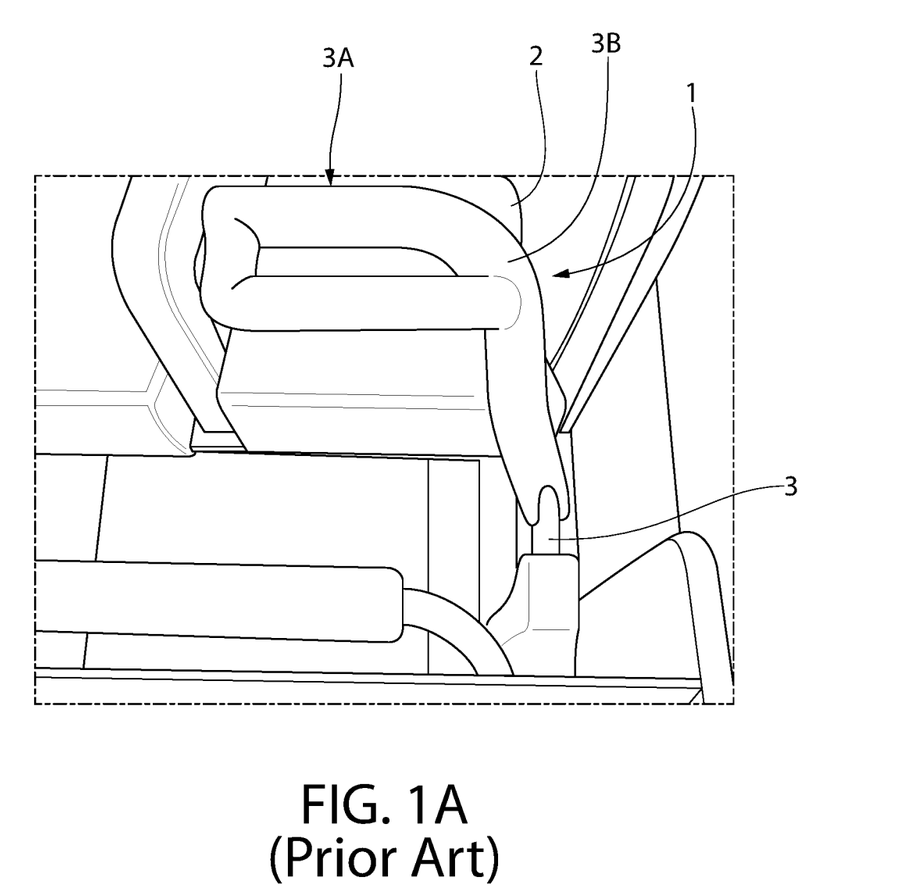
FIG. 1A is a top view of one passenger seat of an amusement ride car showing the passenger lap bar positioned in its locked condition.
Figure 1B:
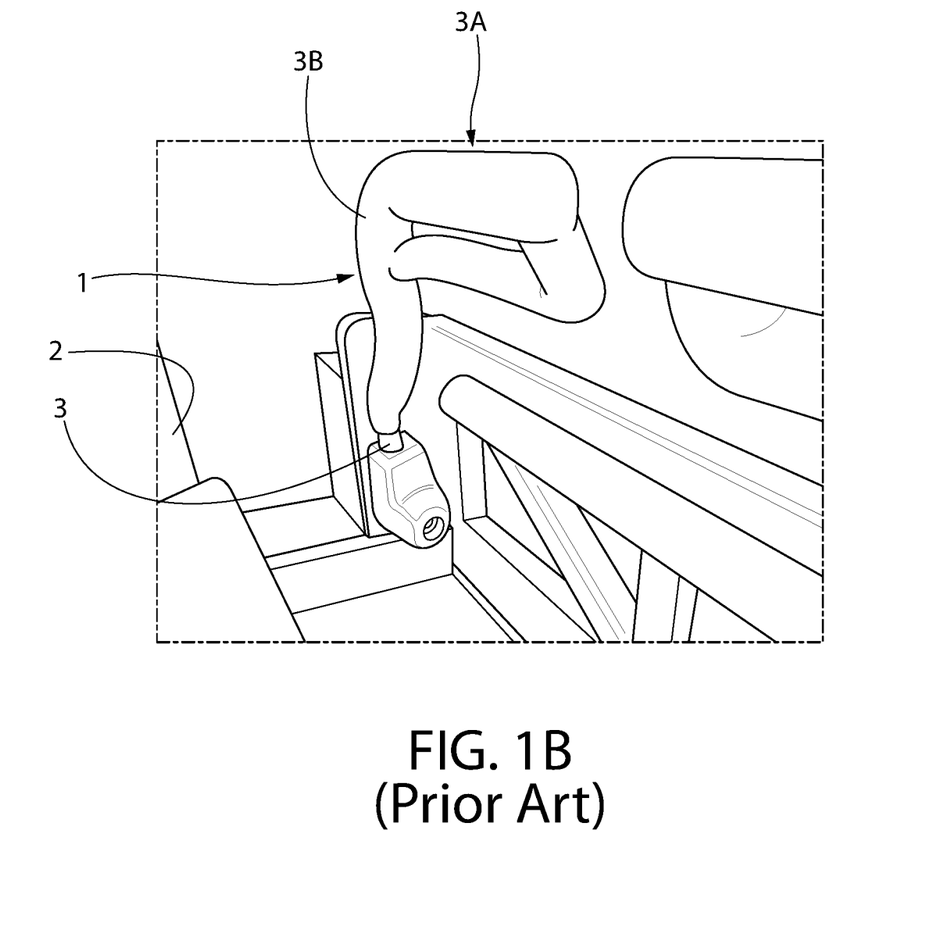
FIG. 1B is a side view of the art passenger lap bar of FIG. 1A but positioned in its open condition, permitting passenger ingress/egress.

FIG. 1A depicts a top view of a single passenger prior art lap bar assembly 1 positioned in its locked condition adjacent the passenger seat 2 whereas FIG. 1B depicts a side view of the lap bar 1 in an open condition; the open condition permits passenger ingress/egress. The lap bar comprises a connecting arm 3 and upper lap bar 3A. A cover sleeve 3B surrounds the majority of the lap bar 3A.

Figure 1C:
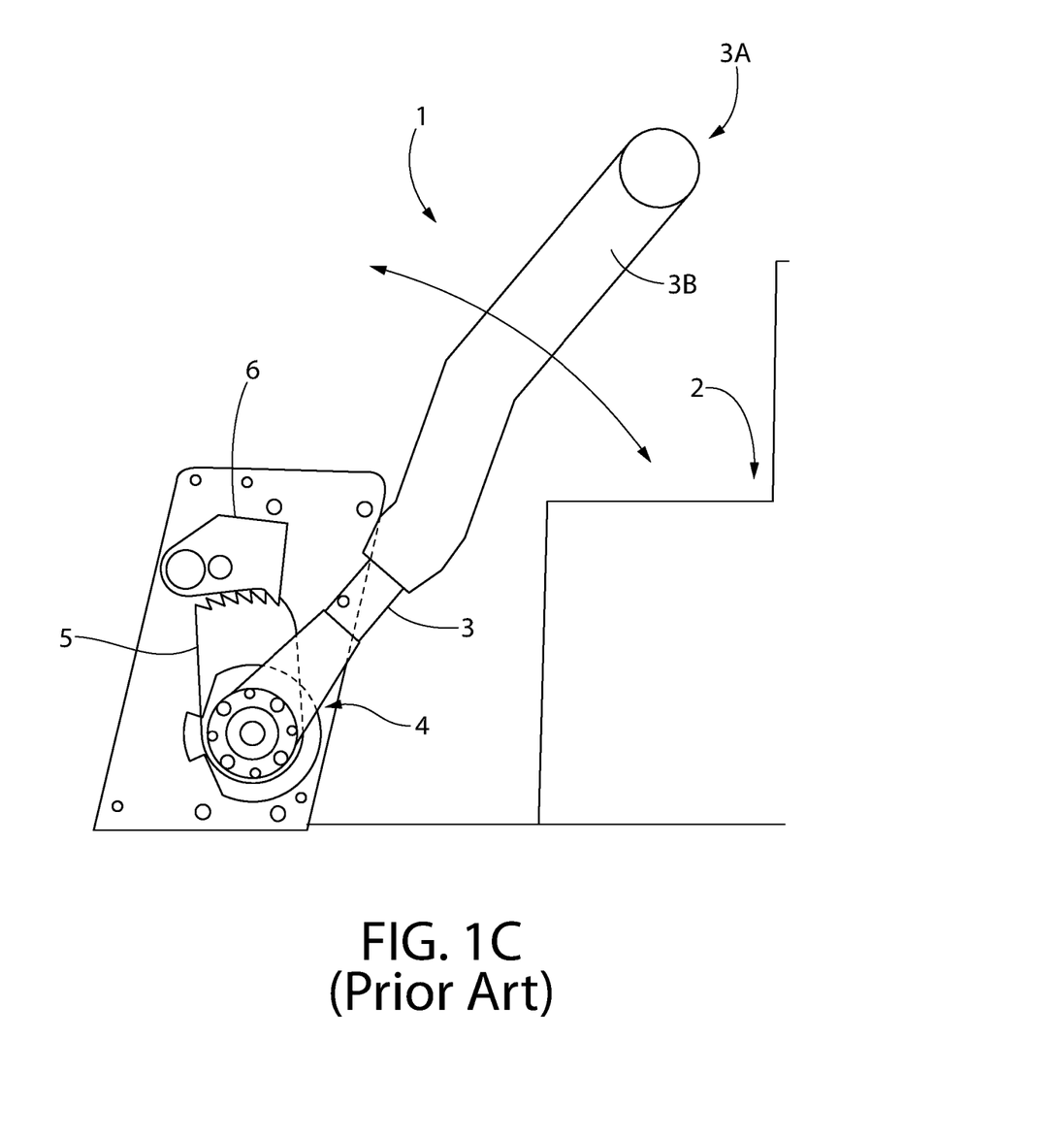
FIG. 1C is a functional diagram of the passenger lap bar of FIGS. 1A-1B depicting the stop sleeve of the connecting arm of the lap bar coupled to a ratchet-pawl system in the amusement ride car.
Figure 1D:
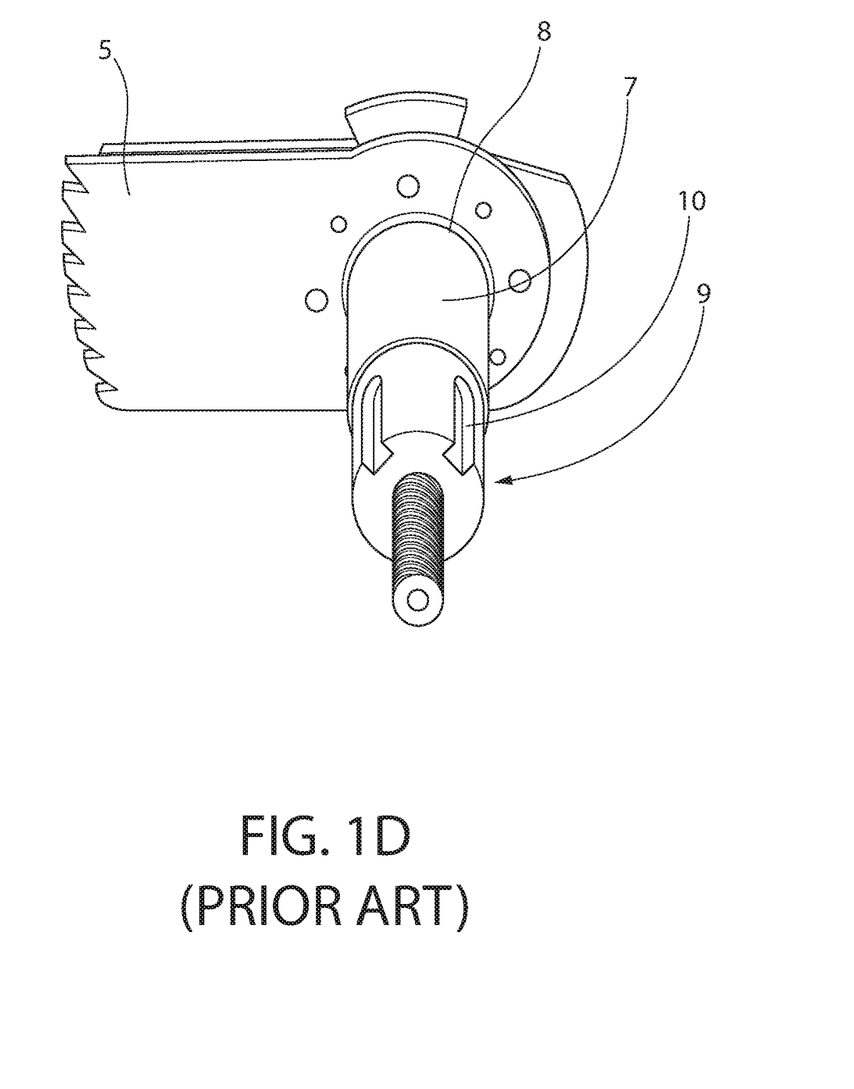
FIG. 1D is an end view of a prior art lap bar axle having a "keyed" end that couples to the connecting arm of the lap bar.
Figure 1E:
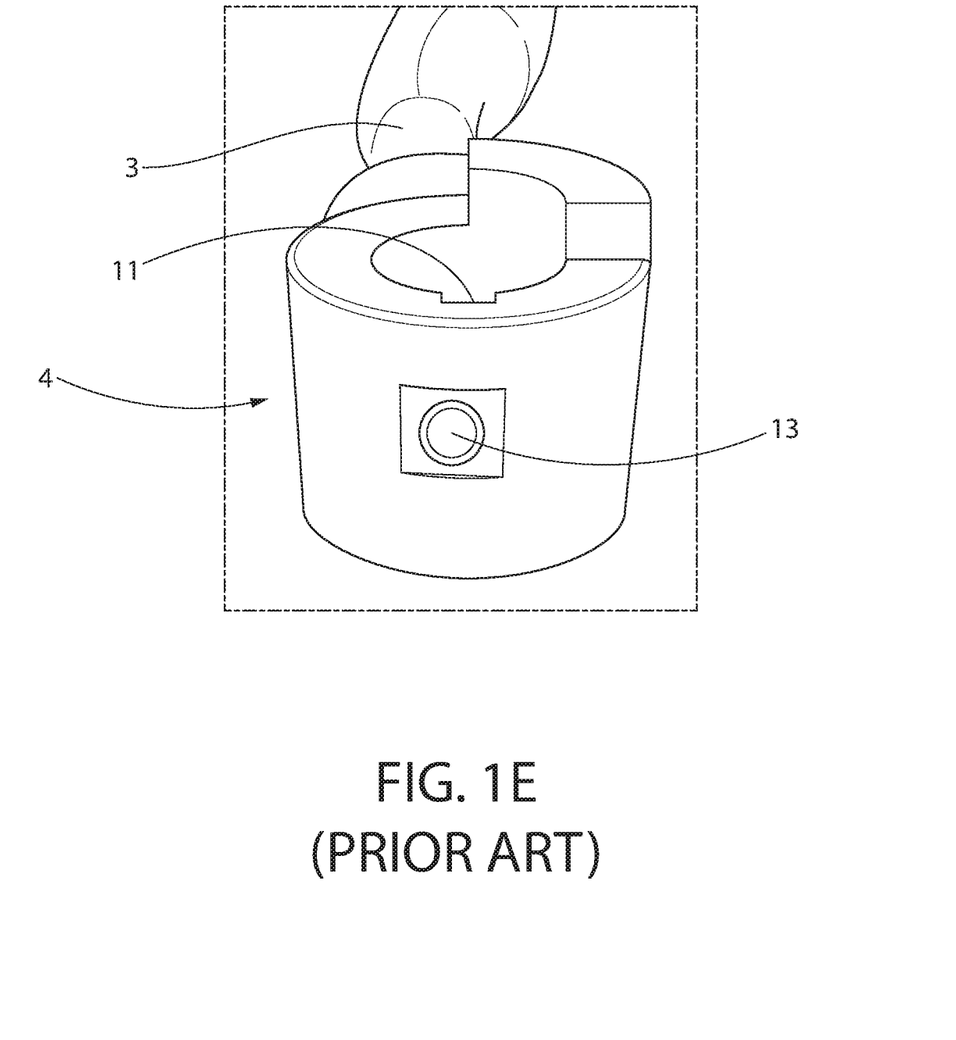
FIG. 1E is a bottom view of the prior art stop sleeve of the connecting arm being "keyed" for receiving the second keyed end of the lap bar axle therein.
Figure 1F:
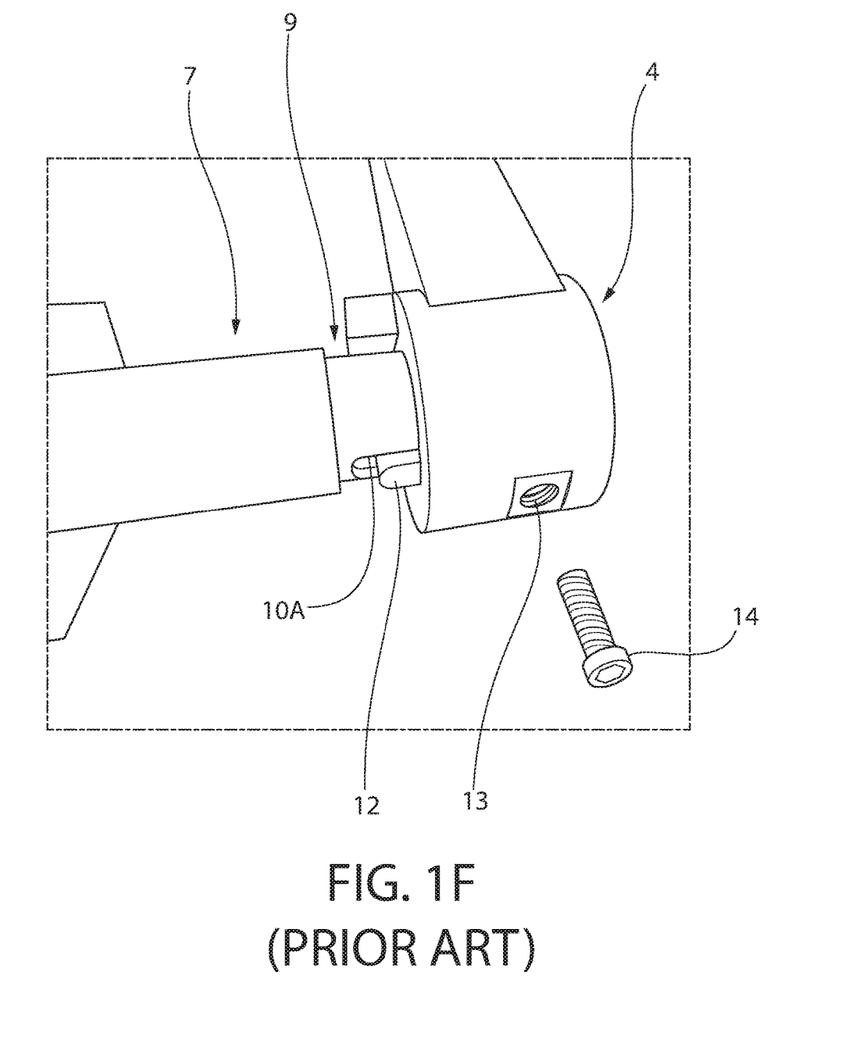
FIG. 1F is a partial view showing the prior art lap bar axle secured to the prior art stop sleeve of the connecting arm.

As shown in FIG. 1C, the connecting arm 3 comprises a stop sleeve 4 which interfaces with an axle 7 (see FIG. 1D) of a ratchet 5 and pawl 6 system for locking the lap bar assembly 1 in the closed condition and then releasing it once the amusement ride is over. In particular, the lap bar axle 7 (see FIG. 1D) has a first end 8 secured to the ratchet 5 while a second end 9 couples to the stop sleeve 4 (FIG. 1C) of the connecting arm 3. The second end 9 is "keyed" 10 so as to be received in a corresponding keyed sleeve 11 (FIG. 1E) in the stop sleeve 4 of the connecting arm 3. When the second end 9 is aligned with the keyed sleeve 11 and inserted therein (FIG. 1F), a lap bar key stock 12 (e.g., ⅜" key stock) is then inserted through the openings 10A in the keyed portion 10 of the second end to prevent the second end 9 of the lap bar axle 7 from backing out of the keyed sleeve 11. Furthermore, a set screw 14 (e.g., a ⅜-24 socket set screw) is screwed into a corresponding threaded aperture 13 (FIG. 1F) to tighten the lap bar key stock 12 against the second end 9 of the lap bar axle 7. Although not shown, a jam nut (e.g., a ⅜-34 jam nut) is threaded onto the set screw 14 and tightened to secure the set screw 14 tight against the second end 9 of the lap bar axle 7.

However, there remains a need for a more convenient means for securing the lap bar to the lap bar axle while optimizing resistance against lap bar axle/connecting arm slippage.

All references cited herein are incorporated herein by reference in their entireties.

BRIEF SUMMARY OF THE INVENTION

A releasably lockable lap bar assembly for use in an amusement ride car is disclosed. The lap bar assembly comprises: a lap bar connecting arm having a distal end with a stop sleeve, wherein the stop sleeve comprises a plurality of splines distributed around an interior surface of the stop sleeve; a lap bar axle having a first end coupled to a releasable lock mechanism and a second end having a plurality of splines distributed around a periphery of the axle; and wherein the second end of the lap bar axle is received within the stop sleeve and the plurality of splines of the second end interdigitate with the plurality of splines of the stop sleeve to form a tight engagement and thereby secure the lap bar connecting arm to the lap bar axle.

A method for forming a releasably lockable lap bar assembly for use in an amusement ride car is disclosed. The method comprises: forming a stop sleeve at a distal end of a lap bar connecting arm; forming a plurality of splines that are distributed around an interior surface of the stop sleeve; forming one end of a lap bar axle to have a plurality of splines distributed around a periphery of the one end while coupling the other end of the lap bar axle to a releasable lock mechanism; and positioning the one end of the lap bar axle within the stop sleeve so that the plurality of splines of the one end interdigitate with the plurality of splines of the stop sleeve to form a tight engagement and to thereby secure the lap bar connecting arm to the lap bar axle.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

Figure 3:
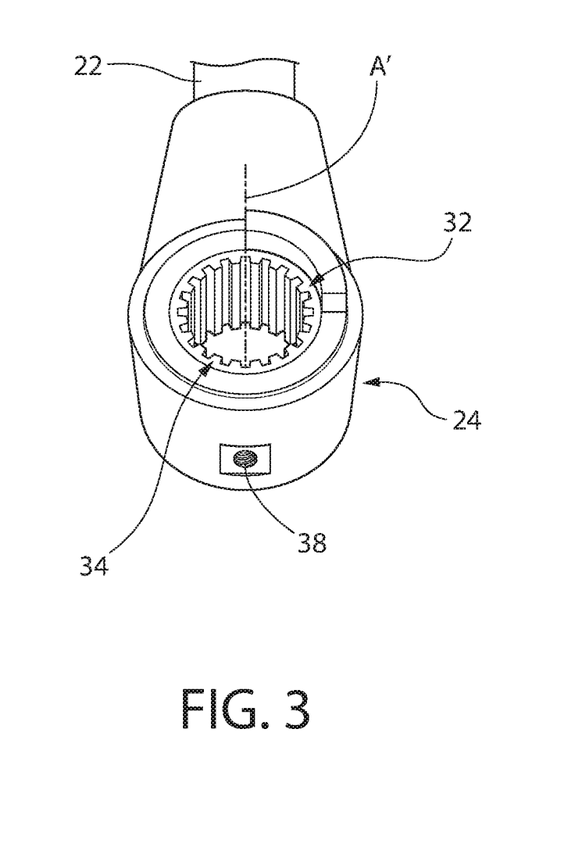
FIG. 3 is a top view of the splined inner sleeve of the stop sleeve of the lap bar of the present invention.

The invention of the present application is directed to a lap bar assembly 20 (FIG. 4) having a connecting arm 22 (FIG. 3) whose stop sleeve 24 is coupled to a lap bar axle 26

Figure 2:
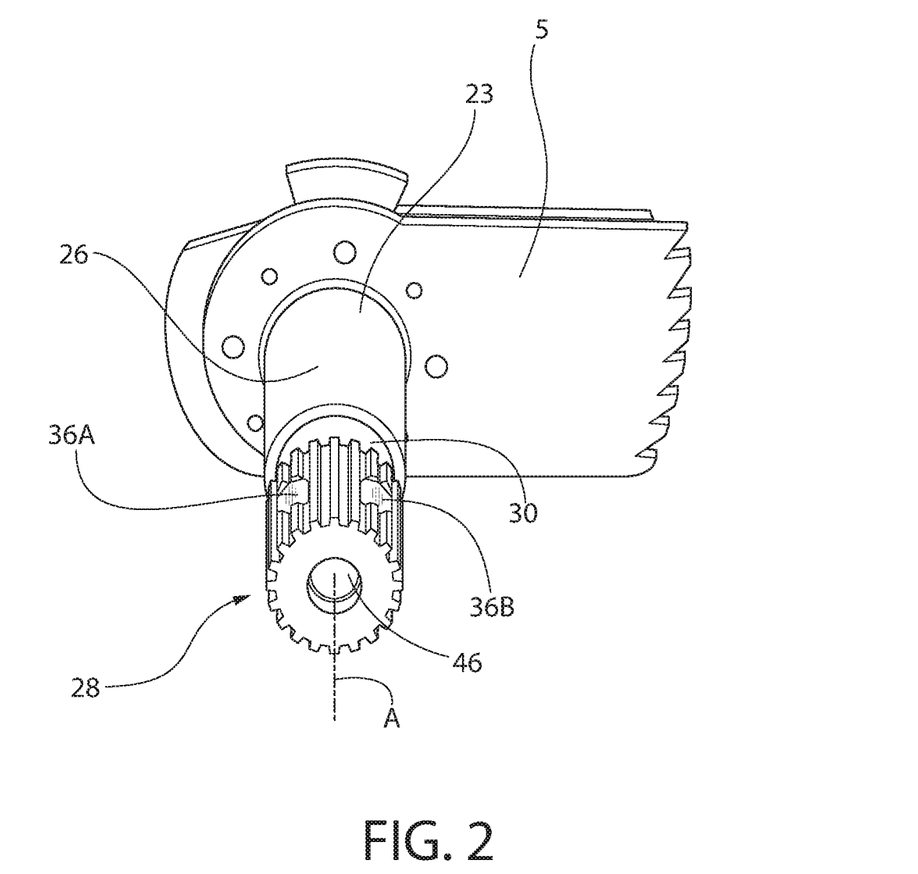
FIG. 2 is an end view of the splined end of the lap bar axle of the present invention.

(FIG. 4) using a splined interface. (Although not shown, the upper end of the lap bar assembly 20 is similar to the lap bar 3A and whose majority is also surrounded by the cover sleeve 3B). In particular, as shown in FIG. 2, a first end 23 of the lap bar axle is coupled to the ratchet 5 while a second end 28 of the lap bar axle 26 comprises a plurality of splines 30 that are distributed around the periphery of the second end 28 and are aligned with a longitudinal axis A of the axle 26. These splines 30 are received in the stop sleeve 24 (FIG. 3) of the connecting arm 22 by an inner sleeve 32 having a plurality of splines 34 (FIG. 3) distributed within an interior surface of the sleeve 32 and which are aligned with an axis A' of the sleeve 32. Thus, to secure the lap bar axle 26 within the stop sleeve 24 of the connecting arm 22, the splines 30 of the second end 28 are positioned to interdigitate with the splines 34 in the sleeve 32 and the second end 28 is slid into the sleeve 32. The splines 30 of the second end 28 and the splines 34 of the sleeve 32 operate to form a tight engagement of the lap bar axle 26 and the connecting arm 22, eliminating or greatly reducing any possible slippage of the lap bar axle 26 within the stop sleeve 24 of the connecting arm 22.

Figure 4:
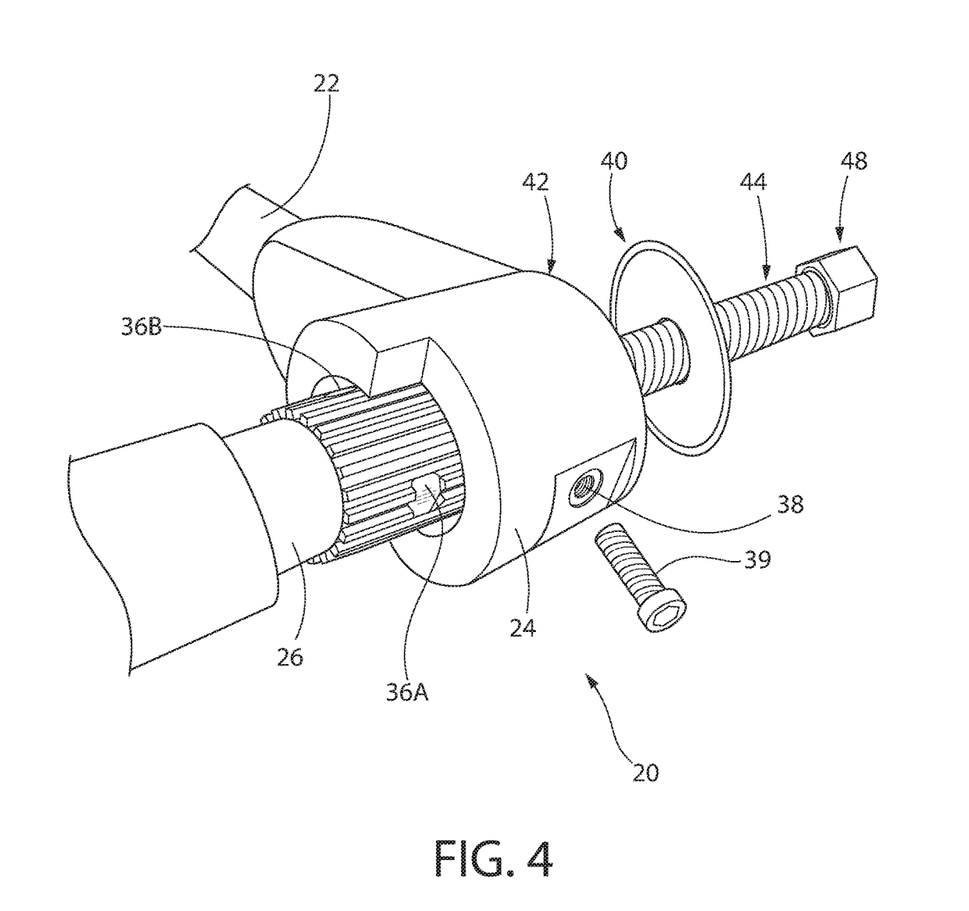
FIG. 4 is a partial isometric view of the interface between the splined end of the lap bar axle and the stop sleeve of the lap bar showing the overall present invention.

It should be noted that the splines 30 of the second end 28 include flat engagement surfaces 36A and 36B (FIG. 2). The purpose of these is to receive the distal end of bolts 39 that are screwed through corresponding apertures (only one of which 38 is shown in FIG. 4) in the stop sleeve 24 of the connecting arm 22. The bolts 39 used in the invention 20 prevent the second end 28 of the lap bar axle 30 from backing out of the sleeve 32. Furthermore, as shown in FIG. 4, a lap bar retaining washer 40 is positioned against an outer stop sleeve surface 42. One end of a fastener 44 (e.g., a screw, ½-20 thread) is passed through the opening in the washer 40 and is received in a threaded cavity 46 (FIG. 2) of the second end 28 of the lap bar axle 26. A nut 48 (e.g., a lock nut ½-20 thread) is secured to the other end of the fastener 44 against the washer 40.

While the invention has been described in detail and with reference to specific examples thereof, it will be apparent to one skilled in the art that various changes and modifications can be made therein without departing from the spirit and scope thereof.

What is claimed is:

1. A releasably lockable lap bar assembly for use in an amusement ride car, said lap bar assembly comprising:
   a lap bar connecting arm having a distal end with a stop sleeve, said stop sleeve comprising a plurality of splines distributed around an interior surface of said stop sleeve;
   a lap bar axle having a first end coupled to a releasable lock mechanism and a second end having a plurality of splines distributed around a periphery of said axle; and
   wherein said second end of said lap bar axle is received within said stop sleeve and said plurality of splines of said second end interdigitate with said plurality of splines of said stop sleeve to form a tight engagement and thereby secure said lap bar connecting arm to said lap bar axle.

2. The releasably lockable lap bar assembly of claim 1 wherein said plurality of splines of said second end are aligned with a longitudinal axis of said lap bar axle.

3. The releasably lockable lap bar assembly of claim 2 wherein said plurality of splines of said stop sleeve are aligned with an axis of said stop sleeve.

4. The releasably lockable lap bar assembly of claim 1 wherein said plurality of splines of said second end comprise at least one flat engagement surface and wherein said stop sleeve comprises at least one threaded aperture for receiving a bolt therein and wherein said bolt has an end that engages said at least one flat engagement surface.

5. A method for forming a releasably lockable lap bar assembly for use in an amusement ride car, said method comprising:
   forming a stop sleeve at a distal end of a lap bar connecting arm;
   forming a plurality of splines that are distributed around an interior surface of said stop sleeve;
   forming one end of a lap bar axle to have a plurality of splines distributed around a periphery of said one end while coupling the other end of said lap bar axle to a releasable lock mechanism; and
   positioning said one end of said lap bar axle within said stop sleeve so that said plurality of splines of said one end interdigitate with said plurality of splines of said stop sleeve to form a tight engagement and to thereby secure said lap bar connecting arm to said lap bar axle.

6. The method of claim 5 wherein said step of forming a plurality of splines that are distributed around a periphery of said one end comprises forming said plurality of splines to be aligned with a longitudinal axis of said lap bar axle.

7. The method of claim 6 wherein said step of forming a plurality of splines that are distributed around an interior surface of said stop sleeve comprises forming said plurality of splines to be aligned with an axis of said stop sleeve.

8. The method of claim 5 wherein said step of forming one end of a lap bar axle to have a plurality of splines distributed around a periphery of said one end comprises forming at least one flat engagement surface among said plurality of splines and wherein said step of forming a stop sleeve at a distal end of said lap bar connecting arm comprises forming at least one threaded aperture for receiving at least one bolt and wherein said at least one flat engagement surface is engaged by a distal end of said at least bolt.

* * * * *